United States Patent [19]

Everest

[11] 4,301,682
[45] Nov. 24, 1981

[54] INFRARED THERMOMETER IN MAKING STRESS-DEGREE MEASUREMENTS FOR IRRIGATION PURPOSES

[76] Inventor: Charles E. Everest, 11662 Pincian Way, Santa Ana, Calif. 92705

[21] Appl. No.: 69,269

[22] Filed: Aug. 24, 1979

[51] Int. Cl.³ ............................................... G01J 5/16
[52] U.S. Cl. .................................. 73/355 R; 250/338
[58] Field of Search ............... 73/73, 355 R, 355 EM; 250/338

[56] References Cited

U.S. PATENT DOCUMENTS

| | | | |
|---|---|---|---|
| 2,986,935 | 6/1961 | Cupido et al. ...................... | 73/341 X |
| 3,316,765 | 5/1967 | Trolander et al. ............. | 73/362 AR |
| 3,435,237 | 3/1969 | Collins ........................... | 73/355 R X |
| 3,444,739 | 5/1969 | Treharne ........................... | 73/355 R |
| 3,451,254 | 6/1969 | Maley ......................... | 73/355 EM X |
| 3,486,113 | 12/1969 | Foster .............................. | 250/252 X |
| 3,519,352 | 7/1970 | Engborg ............................ | 356/43 |
| 3,611,806 | 10/1971 | Hishikari ............................ | 356/43 |
| 3,769,581 | 10/1973 | König et al. ......................... | 73/73 X |
| 4,069,716 | 1/1978 | Vanasco et al. ....................... | 73/73 |
| 4,078,179 | 3/1978 | Everest et al. ....................... | 250/338 |
| 4,111,717 | 9/1978 | Baxter ........................... | 73/355 R X |
| 4,132,902 | 1/1979 | Everest ................................ | 307/116 |

OTHER PUBLICATIONS

Publication, "The AG 42: A Research Tool", Telatemp Corp., Sales Brochure, (4 pages), (Surface Thermometry).
Publication, Newspaper Article, "Irrigation Enters 'The Space Age'", Arizona Daily News, 6/11/79.

Primary Examiner—Daniel M. Yasich
Attorney, Agent, or Firm—Fischer, Tachner & Strauss

[57] ABSTRACT

A temperature measuring apparatus or device for measuring the temperature of an object or a series of closely adjacent objects through the measurement of relative infrared radiation is normally referred to as an infrared thermometer. Known infrared thermometers can be modified so as to be useful in making stress-degree measurements as are needed in determining when plants or crops should be watered or irrigated by including within such devices a temperature detector capable of providing an electrical signal. Such modified thermometers include a circuit which relates the signal produced by the temperature detector to the signal produced by the infrared radiation detector used in such a device so as to display the difference between the temperature detected by the infrared detector used and the temperature detected by the temperature detector.

7 Claims, 1 Drawing Figure

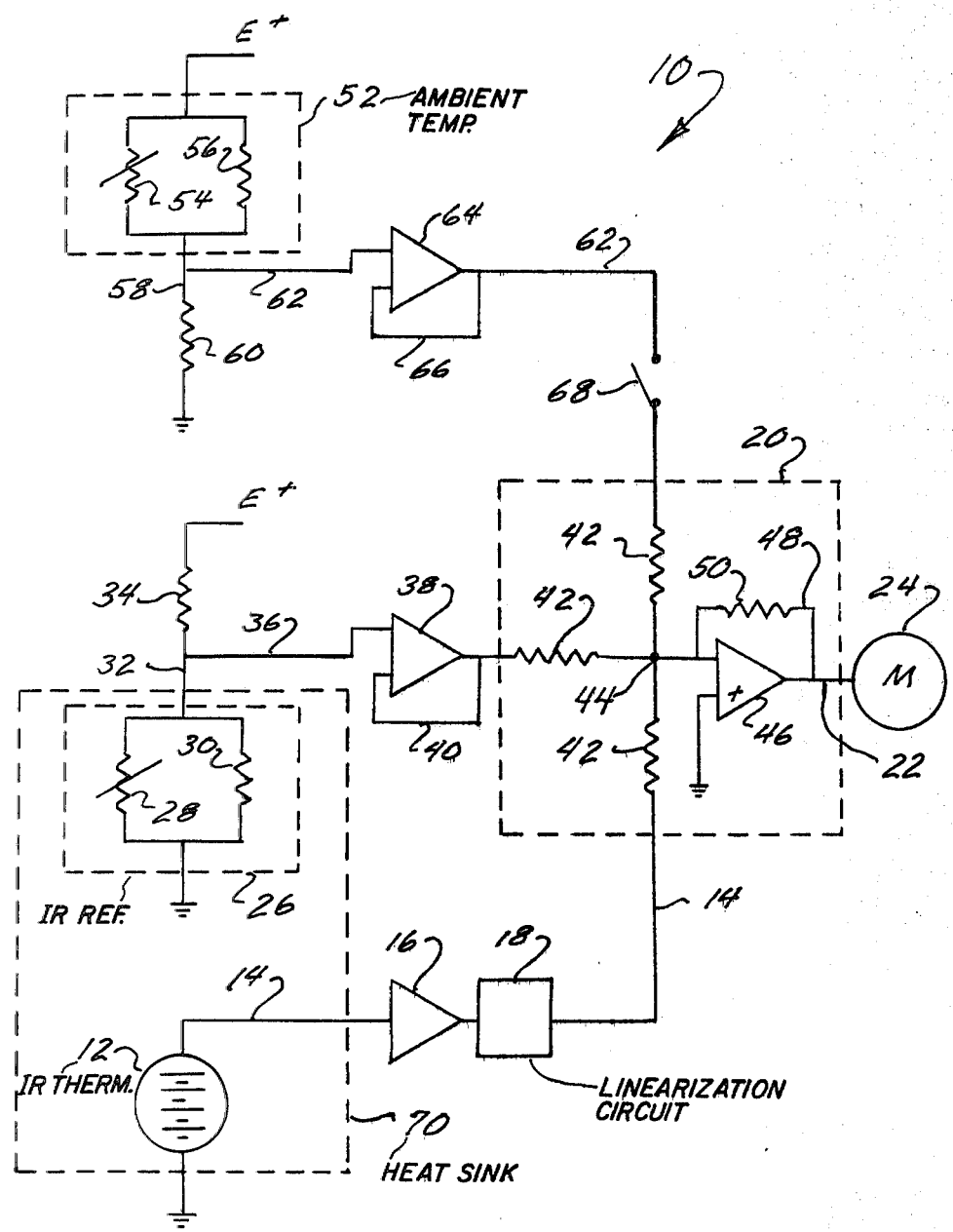

INFRARED THERMOMETER IN MAKING STRESS-DEGREE MEASUREMENTS FOR IRRIGATION PURPOSES

BACKGROUND OF THE INVENTION

The invention set forth in this specification pertains to new and improved infrared thermometers which are primarily intended for use in making stress-degree measurements for irrigation purposes.

So-called infrared thermometers are in effect temperature measuring apparatuses or devices for use in measuring the temperature of an object or a series of closely adjacent objects through the measuring of relative infrared radiation levels by the use of an infrared detector—frequently a thermopile. In these devices a circuit is used to convert the signal produced by the infrared detector and associated circuitry such as, for example, an amplifier and a linearization circuit, into an output signal capable of indicating a numerical value. This output signal is then utilized in a meter type structure such as a digital display or a known meter movement in order to indicate a numerical temperature value.

The temperature indicated corresponds to the temperature of an object or a series of objects as indicated by the relative levels of radiation of such an object or series of objects and of the infrared detector itself. Such infrared thermometers are considered to be very desirable for many purposes. They normally are constructed as hand-held, gun-like instruments which can be easily and conveniently used.

Unfortunately such infrared thermometers do not fulfill a current need for devices which can simply and easily make stress-degree measurements as are required or desirable for a number of agricultural applications. These measurements require a comparison of the temperature of a plant or of a crop canopy with the ambient temperature adjacent to the plant or crop canopy. Such a comparison is desirable in determining whether or not a plant or crop is "stressed" in the sense that it is not transpiring a desired amount of water vapor.

Normally the transpiration of water vapor by a plant lowers the temperature of the plant with respect to the surrounding air temperature. Normally the amount of water that a plant transpires is related to the amount of moisture available to the root system of the plant. Hence, the need for watering or irrigating a plant or a crop can be determined by the differential between the temperature of the plant or crop and the temperature of the ambient air. This differential may be expressed in temperature—degrees or stress-degrees.

Such stress-degrees are normally considered with reference to the number of days when a plant is experiencing moisture stress as the result of inadequate moisture being available to the roots of a plant so as to obtain a composite figure indicating when a plant or crop should be watered or irrigated. The resultant stress-degree-day figure as obtained with reference to the temperature differential between the plant or crop and the ambient air on a number of successive days is important for irrigation and similar watering purposes. Although plants can withstand comparatively restricted periods of a comparatively large amount of moisture stress, the total amount of moisture stress experienced by a plant or crop over a period can have significant effects upon plant growth or yield.

The need for new and improved infrared thermometers in accordance with the invention for making stress-degree measurements is related to the fact that such measurements should be capable of being easily and conveniently made. In the past such stress-degree measurements have been made utilizing both known infrared thermometers and conventional ambient air measuring devices such as conventional mercury thermometers and the like. Such use of two different items of measuring equipment to obtain stress-degree measurements is disadvantageous. With such use of two different items of measuring equipment a limited amount of arithmetic is required. Such arithmatic computations as required while not significantly difficult for many individuals, have proved undesirable because of the frequency of errors. Frequently those employed to make stress-degree measurements can be best described as not being overly literate.

SUMMARY OF THE INVENTION

An object of the present invention is to fulfill the need indicated in the preceding discussion for devices which can be used to simply and easily make stress-degree measurements as are required in a number of agricultural applications. Further objectives of the present invention are to provide devices as indicated which can be easily and conveniently constructed at a comparatively nominal cost, which are effective for their intended purpose, and which are reasonably reliable and which can be utilized satisfactorily over prolonged periods with essentially minimal or no maintenance. Another object of the present invention is to provide infrared thermometers as indicated which are also useful in making various temperature measurements as have previously been made with infrared thermometers. Such measurements are important in agricultural applications in the detection of plant disease, moisture content of the upper surface of the soil, and the like.

In accordance with this invention these various objectives are achieved by providing an apparatus for measuring the temperature of an object through the use of infrared radiation from the object, said apparatus including infrared detector means responsive to relative infrared radiation levels to provide a radiation level indicating a signal which is proportional to the temperature of said object, circuit means for converting said temperature indicating signal into an output signal capable of being indicated as a numerical value and meter means for indicating a numerical value in accordance with said output signal in which the improvement comprises: temperature detector means for providing a temperature indicating signal which varies in accordance with the ambient temperature adjacent to said apparatus, switch means enabling both said radiation level and temperature indicating signals to simultaneously reach said circuit means, and said circuit means being capable of providing said output signal to said meter means so as to indicate the temperature difference between the temperature detected by said infrared detector means and the temperature detected by said temperature detector means when said switch means is closed.

BRIEF DESCRIPTION OF THE DRAWING

Because of the nature of the present invention it is best described with reference to the accompanying drawing in which there is shown a circuit diagram indicating the essential features of a presently preferred form of a circuit for use in practicing the present invention.

The circuit illustrated in the drawing has been designed so as to utilize the operative concepts or principles of the invention verbally expressed in the appended claims forming a part of this disclosure. In the interest of brevity many details which are considered to be within the scope of routine design and engineering skill in the field of temperature measurement through the use of infrared detectors are omitted from the drawing and from the remainder of this specification. Thus, for example, the drawing does not indicate the preferred utilization of the illustrated circuit in a hand-held infrared thermometer or gun and neither are specific circuit details of conventional "subcircuits" illustrated in the drawing.

DETAILED DESCRIPTION

In the drawing there is shown a complete circuit 10 as used in an apparatus (not shown) for measuring the temperature of an object or a series of closely adjacent objects such as, for example, a tree or bush or a series of grain plants located adjacent to one another through the use of infrared radiation as is given off by or from such an object. The circuit 10 employs as an infrared (IR) detector a known, commercially available thermopile structure 12 for the purpose of comparing the relative levels of infrared radiation of both the thermopile structure 12 and such an object (or objects) in order to provide a signal through a line 14 to a conventional preamplifier 16 and then to a known linearization circuit 18 so that a first signal is supplied through the line 14 to a circuit 20 as indicated by a dotted line box in the drawing. The purpose of this circuit 20 is to provide an output signal through another line 22 to a meter 24 such as a known digital readout device which will display a numerical value in accordance with the output signal so as to indicate temperature.

Because the particular infrared (IR) detector previously described is a thermopile structure 12 it is necessary to utilize with it various circuit components as hereafter described so as to provide a reference temperature to the circuit 20 so that the value displayed on the meter 24 will in fact correspond to normal ambient temperature. A thermistor network 26 is employed in the circuit 10 for this purpose. In the interest of brevity this network 26 is illustrated as including a thermistor 28 and a linearizing resistor 30 connected in parallel in a line 32. The linearizing resistor 30 is considered necessary because of the normally non-linear properties of the thermistor 28. As a practical matter the thermistor network 26 employed is preferably a commercial unit including several thermistors and several linearizing resistors. Such a network is described in the U.S. Pat. No. 3,316,765.

This network 26 is in series with another resistor 34 across a carefully controlled voltage as indicated in the drawing so as to achieve a voltage dividing action such that a varying signal is supplied through a line 36 to a conventional buffer amplifier 38 employed for impedance adjustment purposes in accordance with conventional practice. This amplifier 38 includes a conventional feedback loop 40 and conveys a signal corresponding to ambient temperature through the line 36 to the circuit 20.

Within the circuit 20 the signals supplied to the circuit 20 through the lines 14 and 36 pass through summing resistors 42 to a summing junction 44 which is connected to the input of a conventional operational amplifier 46. At the junction 44 these signals are "summed" so as to create a composite or first signal. This operational amplifier 46 is used with a conventional feedback loop 48 containing a resistor 50. This operational amplifier 46 is used essentially as a computer to provide the output signal to the line 22 previously described. This signal supplied to the line 22 is obtained by converting the composite or first signal into an analog output signal indicating a numerical value capable of being displayed by the meter 24.

The various portions of the circuit 10 discussed in the preceding directly correspond to circuits as have been used in infrared thermometers. The invention adds to the various components indicated in the preceding another thermistor network 52 for sensing ambient temperature adjacent the apparatus and which is preferably identical to the network 26 previously described. For convenience this network 52 is illustrated as including a thermistor 54 and a resistor 56 connected in parallel corresponding to the thermistor 28 and resistor 30 previously described.

This thermistor network 52 is connected in a line 58 in series with a resistor 60 across a carefully controlled voltage as indicated in the drawing so as to achieve a voltage dividing action as previously described. This provides a signal which varies with temperature which is supplied through a line 62 to another conventional buffer amplifier 64 corresponding to the amplifier 38 previously discussed. A feedback loop 66 is used with this amplifier 64. The output of the amplifier 64 passes through the line 62 to a switch 68. When this switch 68 is closed this line 62 is connected to the circuit 20. More specifically it is connected to the summing junction 44 through another summing resistor 42 as indicated.

During the use of the circuit 10 for normal temperature measurements the switch 68 is normally open. When it is open the thermopile structure 12 will in effect compare its own level of infrared radiation with the level of infrared radiation given off by an object or a series of closely located objects toward which the thermopile 12 is directed as, for example, through the use of conventional optics. Concurrently the thermistor network 26 will be responsive so as to obtain an indication of the ambient reference temperature. At this time the circuit 20 will in effect correlate the differential between the levels of infrared radiation and the ambient reference temperature so that the meter 24 will indicate the temperature of the object or objects noted.

When the switch 68 is closed the thermistor network 52 will operate in the same manner as the thermistor network 26 so as to provide what may be referred to as a third signal to the circuit 20. Because of differences in the manners in which voltages are applied across the networks 26 and 52, this third signal will be in opposition to the signal derived from the network 26. The various signals originating from the thermopile structure 12 and the two thermistor networks 26 and 52 will, in effect, be summed or compared at the junction 44 in such a manner that the signal supplied through the line 62 will cancel out or nearly cancel out the signal supplied through the line 36.

As a consequence of this when the switch 68 is closed the circuit 20 will provide an output signal through the line 22 to the meter 24 such that the meter 24 will display the temperature indicated by the thermopile structure 12 alone or very nearly this temperature. This, of course, corresponds to the differential between the ambient temperature and the temperature detected utilizing the thermopile structure 12. This value will correspond to a stress-degree reading as indicated in the preceding.

Because the respective signals derived from identical networks 26 and 52 are in opposition, their effect on the circuit 10 would appear to be nil. Thus, it would appear possible to design the circuit 10 so as to utilize only one of the two thermistor networks 26 and 52 and, of course, only a single amplifier corresponding to the amplifiers 38 and 64. This could be accomplished by merely making a circuit so that only such a single thermistor network and associated components is used and so that a switch corresponding to the switch 68 could be used to control a signal from such a network being supplied to the circuit 20. Whenever a signal from any such single thermistor network was interrupted as, for example by the switch being opened, only the thermopile would be in the circuit and the meter 24 would display a temperature value corresponding to a stress-degree reading as indicated in the preceding discussion. The reasons why this is disadvantageous are considered rather significant to the present invention.

During the use of a hand-held infrared thermometer ambient temperature changes in and around the instrument are apt to occur relatively rapidly. Since ambient temperature is in effect utilized as a reference in connection with the thermopile structure 12, such rapid temperature changes can affect the stability of the temperature readings achieved as a result of the use of the thermopile structure 12. Since rapidly changing readings are undesirable during the use of a circuit such as the circuit 10 as, for example, in making conventional temperature measurements based on levels of infrared radiation, it is desirable to provide a degree of stability against rapid changes in temperature readings.

This is accomplished by incorporating into an instrument as described a comparatively large mass of material which will change in temperature much less rapidly than the ambient temperature is apt to change. Such a mass is indicated by the dotted block 70 indicated in the drawing. It can conveniently consist of a large body of a metal such as aluminum serving as a heat sink surrounding both the thermopile structure 12 and the thermistor network 26 so that both of them effectively remain at a same relatively constant temperature which does not change rapidly with ambient temperature changes.

With a complete apparatus constructed utilizing the circuit 10 as indicated in the drawing the thermistor network 52 is located in a different manner so that it is as exposed as reasonably possible in order to be sensitive to comparatively minute changes in ambient temperature such as may be encountered in an orchard, a field or the like. This is considered important because comparatively small changes in ambient temperature are of significance in obtaining accurate stress-degree readings.

I claim:

1. An apparatus for measuring the difference in the respective temperatures of an object and ambient air adjacent the object, the apparatus comprising:
   a. an infrared detector for receiving infrared radiation including infrared radiation emitted by said object and for generating a first electrical signal indicative of the intensity of said received radiation,
   b. a heat sink mass in physical contact with said infrared detector,
   c. a first temperature detection device generating a second electrical signal and being in physical contact with said heat sink mass and in close proximity to said infrared detector,
   d. a second temperature detection device generating a third electrical signal and being separated from said heat sink mass and from said infrared detector and exposed to changes in temperature of said ambient air,
   e. said first electrical signal increasing with increasing infrared radiation intensity, said second electrical signal decreasing with increasing temperature, said third electrical signal increasing with increasing temperature,
   f. electrical circuit means connected to the respective outputs of said infrared detector and of said first and second temperature detection devices for generating a measurement signal representative of the sum of said first, second and third electrical signals, and
   g. means for displaying a visible manifestation of said measurement signal.

2. In an apparatus for measuring the temperature of an object through the use of infrared radiation from the object, said apparatus including infrared detector means responsive to relative infrared radiation levels to provide a radiation level indicating a signal which is proportional to the temperature of said object, circuit means for converting said temperature indicating signal into an output signal capable of being indicated as a numerical value and meter means for indicating the numerical value in accordance with said output signal; the improvement comprising:

temperature detector means for providing a temperature indicating signal which varies in accordance with the ambient temperature adjacent to said apparatus,
   switch means connected in series with the output of said temperature detector means for enabling both said radiation level and temperature indicating signals to simultaneously reach said circuit means,
   said circuit means connected to said switch means and to said infrared detector means, and being capable of providing said output signal to said meter means so as to indicate the temperature difference between the temperature detected by said infrared detector means and the temperature detected by said temperature detector means when said switch means is closed,
   said infrared detector means comprises a thermopile means responsive to infrared radiation for providing an intermediate signal to said switch means and said infrared detector means in said circuit means, said intermediate signal corresponding to the difference between the relative infrared radiation levels of said object and said thermopile means and linearizing means for converting said intermediate signal into said radiation level indicating signal so that said radiation level indicating signal varies linearly in accordance with differences in said radiation levels, and
   second temperature detector means for providing a reference signal which varies in accordance with the ambient temperature adjacent to said thermopile means, said second ambient temperature detector means being connected to said circuit means,
   said circuit means being capable of providing an output signal to said meter means in response to said radiation level and said reference signal which indicates the temperature of said object when said switch means is open.

3. The improvement as claimed in claim 2 including:

heat sink means associated with said infrared detector means and said second temperature detector means for minimizing the temperature variation of both said infrared detector means and said second temperature detector means in response to ambient temperature changes.

4. The improvement as claimed in claim 2 wherein:

said circuit means includes summing junction means connected to said infrared detector means, said first mentioned temperature detector means, and said second temperature detector means so as to receive said radiation level, temperature indicating and reference signals to provide a single signal therefrom and amplifier means for providing said output signal connected to said summing junction means.

5. The improvement as claimed in claim 4 wherein:

said summing junction means is a junction and wherein said second temperature detector means provides a reference signal of opposite polarity to said temperature indicating signal.

6. An apparatus for measuring the difference between the temperature of an object and the temperature of ambient air adjacent the object, the apparatus comprising:

an infrared detector for receiving infrared radiation including infrared radiation emanating from said object, said detector generating a first electrical signal indicative of the intensity of said received radiation, first temperature detector means in close proximity to said infrared detector and generating an infrared reference signal indicative of all infrared radiation received by said detector and not emanating from said object, a sensor circuit substantially identical to said first temperature detector means to provide second temperature detector means for generating a second electrical signal indicative of the temperature of ambient air adjacent said object, circuit means connected to the respective outputs of said infrared detector and of said first and second temperature detector means for receiving said first and second electrical signals and said infrared reference signal and for generating an output signal indicative of said temperature difference, and means connected to said circuit means for displaying a numerical value indicative of said temperature difference, said first and second temperature detection means each comprising a thermistor network.

7. The apparatus recited in claim 6 wherein said first temperature detection means and said thermopile structure are surrounded by a common heat sink mass, and wherein said second temperature detection means is outside of and separated from said heat sink mass.

* * * * *